Oct. 11, 1949.  G. F. HAUF  2,484,087
CONSTRUCTION OF IRRIGATION PIPES AND
FLEXIBLE PIPE JOINTS THEREFOR
Filed June 21, 1947  2 Sheets-Sheet 2

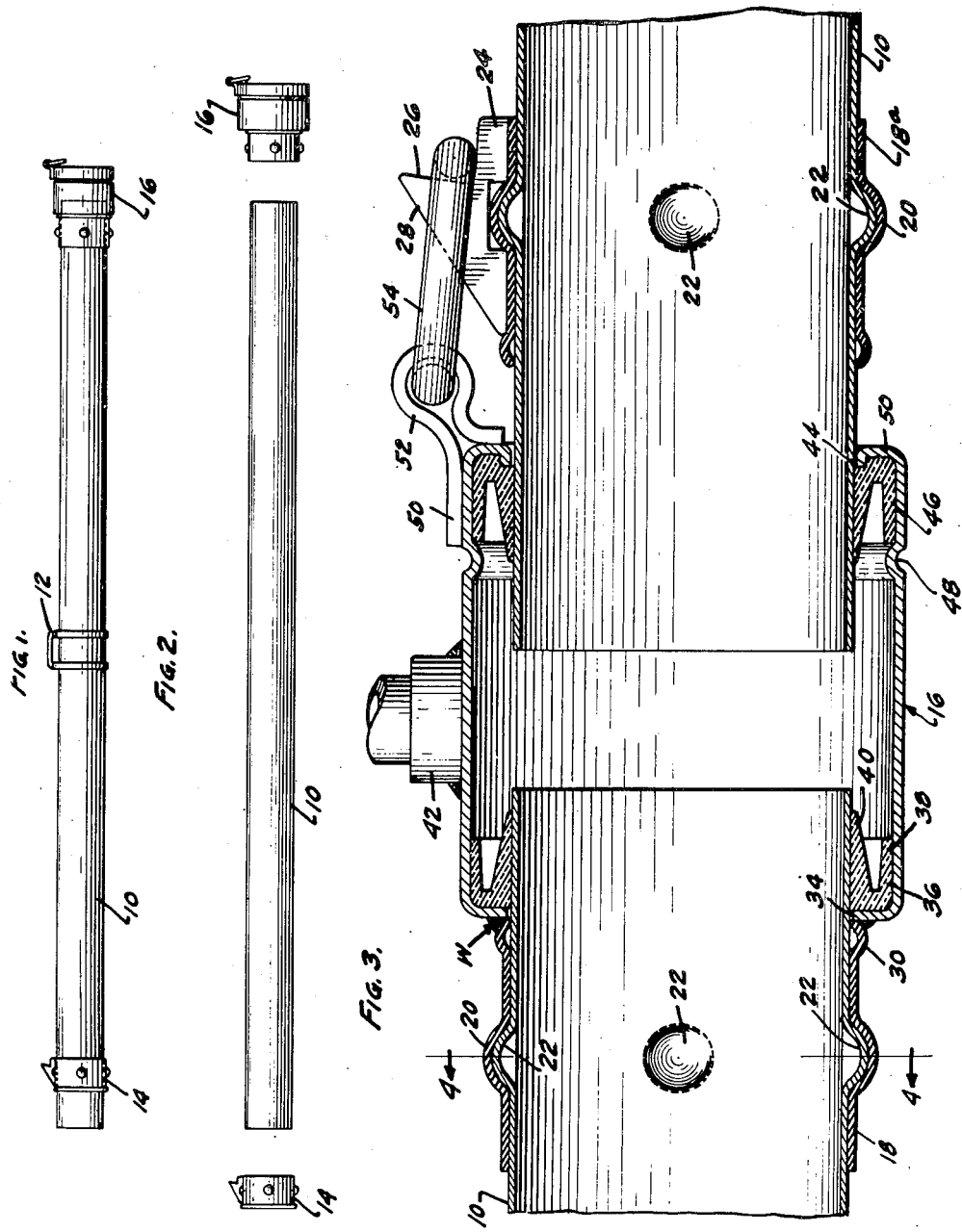

INVENTOR.
GEORGE F. HAUF
BY
Harry H. Hitzeman
ATTORNEY.

Patented Oct. 11, 1949

2,484,087

UNITED STATES PATENT OFFICE 2,484,087

CONSTRUCTION OF IRRIGATION PIPE AND FLEXIBLE PIPE JOINTS THEREFOR

George F. Hauf, River Forest, Ill.

Application June 21, 1947, Serial No. 756,150

7 Claims. (Cl. 285—196)

1

My invention relates to improvements in the construction of irrigation pipe and flexible pipe joints therefor.

My invention relates more particularly to improvements in flexible joints or couplings and to a method of fastening the same to a section of pipe, so that each section of pipe will have one male and one female coupling at its ends, the invention being directed particularly to assembling together pre-fabricated sheet metal, male and female couplings with a section of extremely light piping such as aluminum.

Piping for irrigation purposes, to which this invention is directed, is ordinarily constructed of sections of sheet metal or cast iron pipe having coupler elements at both ends usually a male coupling member at one end and a female coupling member at the other, so that they may be telescopically joined by some quick detachable means, the coupling members also usually permitting limited angular misalignment of the piping to follow the surface terrain of the land to be irrigated.

Since such piping is frequently disassembled and moved to new locations, it follows that several desirable features should be incorporated in any such construction. The coupler and quick detachable means must of necessity be as simple and easy to operate as possible, yet be rugged and durable so that the same may not become broken or out of order. The flexible joints in the couplings must of necessity be fluidtight and capable of withstanding high pressures. Another desirable feature is to make the pipe section as light as possible, since it is frequently handled and would require considerable manual labor if unusually heavy or bulky. In the past, cast iron pipe and cast iron couplings have been employed with some degree of success. As demand for such irrigation piping increased, sheet metal pipe and prefabricated sheet metal couplings have been devised and come into extensive use, both by reason of the fact that the weight thereof is considerably less and the pre-fabrication of the coupler members permitting their construction in such a way that quick and easy detachment and connection of the same was made possible.

The present invention contemplates the use of aluminum or similar lighter material for the piping, the provision of pre-fabricated sheet metal coupler members for both ends of the same and a method of connecting these parts together, so that a much lighter pipe section may be obtained. It will be understood, however, that the invention applies not only to aluminum

2 or similar lighter materials for piping, but may be used to advantage with any and all types of piping.

The principal object of the present invention is to provide an improved pipe section for irrigation purposes, the principal feature of the same being its extreme lightness whereby the sections can be easily and simply handled.

A further object of the invention is to provide an improved construction of piping section provided with male and female coupling members at its ends which may be easily and quickly assembled together by a simple operation whereby sections of piping and individual coupling units can be shipped to dealers in various parts of the country and assembled there as the necessity for their use requires.

A further object of the invention is to provide a construction of the type described that is capable of maintaining a sealed connection under unusually high pressures and in any angular alignment of the pipe sections.

Other objects and advantages will be more apparent from the following description wherein reference is had to the accompanying drawings upon which:

Fig. 1 is a side elevational view of a section of irrigation pipe showing the male and female coupler units attached to the ends of the same;

Fig. 2 is a similar side elevational view in which the male and female coupler units are separated from the pipe section before assembly;

Fig. 3 is a vertical cross sectional view of two pipe sections coupled together showing the female coupler attached to one end of a pipe section in locking engagement with the male coupler of the other section of pipe;

Figure 4:
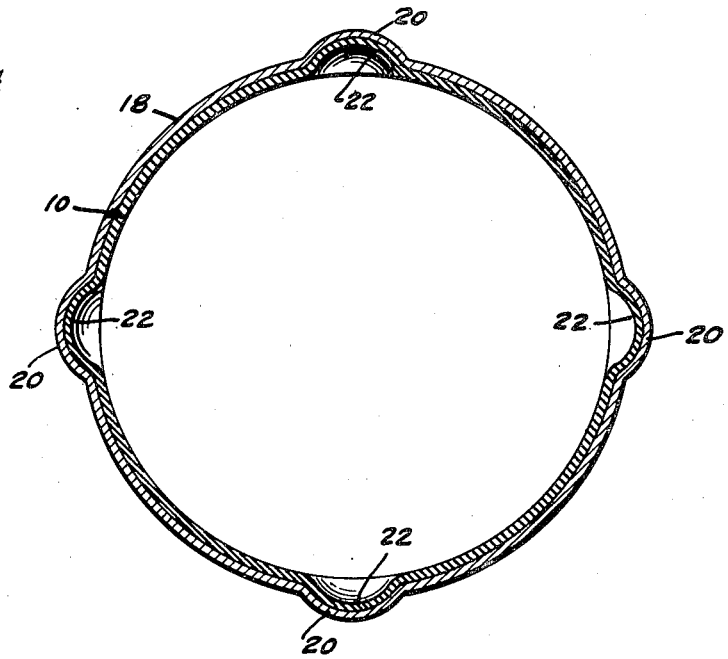
Fig. 4 is a cross sectional view taken on the line 4—4 of Fig. 3 showing the manner in which the coupling member is connected to the pipe section.

In the embodiment of the invention which I have chosen to illustrate the invention, I have shown in Fig. 1 a section of irrigation piping 10 provided with the usual carrying handle 12 and male coupler member 14a at one end of the same and female coupler member 16 at its opposite end. The pipe section 10 as shown in Fig. 2 is preferably made of aluminum or other similar light material and may have the handle 12 affixed thereto by suitable strap members. The male and female coupler members 14 and 16 are pre-fabricated and are adapted to be connected to the section of pipe in a manner which will hereinafter be described.

Referring now specifically to Fig. 3, wherein a cross section of the joint formed by two cooperating couplers is illustrated, I have provided the cylindrical sleeve 18 and 18a which are rigidly connected to one end of the pipe section 10. The cylindrical sleeve 18 is of a size having an inside diameter slightly larger than the diameter of the pipe 10 and is connected thereto by means of a plurality of spaced embossments or buttons 20 and 22, the embossments 20 being pre-formed in the cylindrical sleeve 18 and the embossments 22 being formed in the pipe sections 10 at the time of assembly to the coupler members, later to be described. By connecting these parts together with a plurality of these embossments around the periphery of the pipe and ring member, independent movement between the same, both laterally and rotary, is not possible.

The cylindrical sleeve 18a mounted on the male end of the pipe is provided with a block 24 having the shoulder 26 and the inclined wall portion 28 and solidly connected to the cylindrical sleeve by welding or other suitable means. It will be noted that the cylindrical sleeve 18a is positioned upon the end of the pipe 10 a sufficient distance from the end of the pipe, so that it can be entered into the female coupler member a desired distance. I provide a rolled edge 30 on each of the cylindrical sleeves 18 and 18a, the edge on the cylindrical sleeve 18a being for the purpose of limiting the distance that the pipe 10 may be inserted into the female coupler 32.

The female coupler 32 may be generally cylindrical in shape and be provided with an opening 34 to receive the extended end of pipe 10. To secure the same upon the end of the pipe I preferably weld at the edge W around the periphery of the cylindrical sleeve 18. In order to make the joint between the coupler and the pipe fluid-tight, I position a cylindrical gasket 36 about the end of pipe 10, the gasket being generally V-shaped and having the legs 38 and 40 normally pressing against the inner wall of the coupler and the outer wall of the pipe. Thus, when fluid under pressure is passing through the coupling, it will tend to increase the effectiveness of the seal.

The coupler 32 may be provided with a boss 42 to receive a riser pipe to the top of which a sprinkler head is connected, so that water flowing through the pipes may pass out through the sprinkler heads for the purpose of irrigation. The forward end of the coupler 32 is provided with an opening 44 that is curled in to reinforce the same, the opening being adapted to receive the end of an adjacent pipe section 10. I also provide a gasket 46 in the forward end of the coupler being positioned between a turned in groove 48 and the forward wall 50 of the coupler. The gasket may be generally similar to the gasket 36, being generally V-shaped in cross section and having one leg positioned against the inner wall of the coupler and the other leg encircling the end of the pipe 10. In this condition fluid under pressure will tend to increase the effectiveness of the seal by bearing against the legs of the gasket.

To pivotally connect together the pipe sections, and prevent their disengagement in use, I provide a strap member 50 that is welded or otherwise secured to the coupler member 32. This strap is formed with a circular opening 52 to receive a link member 54. The link member is adapted to latch over the shoulder 26 of the block 24 previously described, thus effectively connecting together the two pipe sections. Since this connection is loose, the pipe connections are free to be disposed angularly with relation to each other without impairing the effectiveness of the sealing in the coupler. Also, whenever, it is desired to disconnect two sections of pipe, this is done by grasping one side of the link member with a hook or similar tool and pulling the same upwardly over the shoulder 26.

Figure 5:
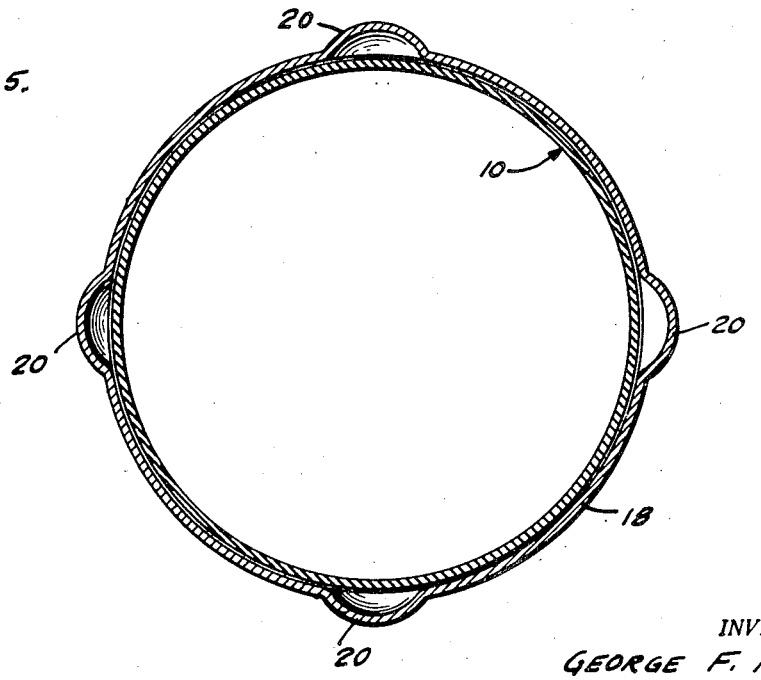
Fig. 5 is a similar sectional view thereof taken before their assembly together.

The manner in which the pipe couplings and the sections of pipe are connected together will now be described. Thus in Fig. 5, I have shown a cross sectional view of one of the cylindrical sleeves 18 which has been pre-fabricated to include therein the embossments 20 spaced at regular intervals about the periphery of the same. The pipe section 10 is inserted into the cylindrical sleeve and, by any suitable means, is pressed outwardly in the embossments 20 and effectively connecting the pipe section and the ring member together.

While I have illustrated and described a specific embodiment of my invention, it will be apparent that variations may be had in the same without departing from the spirit of the invention. While the embossments which I effect to connect together the sections of pipe and couplings are generally semi-spherical in shape, I contemplate that elongated embossments both laterally of the pipe and radially thereof may be provided, if desired.

This method of securing together couplings made of sheet metal stamping and aluminum pipe sections is further advantageous in that welding, brazing or similar types of connections between steel or other metals and aluminum sets up an electrolytic condition which causes corrosion at the joint and is, therefore, impractical for irrigation pipe purposes. By this method there is no reliance on metallic juncture between the different metals. A mechanical connection is formed, but the pressure seal is obtained by means of the gasket placed in the female coupler.

I contemplate that changes and modifications may be made without departing from the spirit of the invention and what I desire to secure and protect is more fully set forth in the appended claims.

I claim:

1. An irrigation pipe having a coupler at its end, said coupler member having a tubular collar connected thereto, a pipe extended through said tubular collar into said coupler member, a V-shaped circular gasket positioned about said pipe member within said coupler member, a peripheral row of semi-spherically shaped embossments formed in said collar member and complementary embossments in said pipe for connecting said coupler to said pipe in a rigid manner, leakage being prevented by said gasket.

2. Irrigation piping comprising a pipe having a cylindrical sleeve telescoped thereover and secured thereto adjacent one end of the same by a plurality of complementary embossments in said pipe and said cylindrical sleeve, a cylindrical coupler member having an inwardly turned edge flange, a circular opening in said flange, said pipe extended into said opening with the edge of said cylindrical sleeve abutting said edge flange and being welded thereto and a V-shaped gasket positioned about the end of said pipe within said coupler member.

3. Irrigation piping comprising a pipe having a cylindrical sleeve telescoped thereover and secured thereto adjacent one end of the same by a peripheral row of complementary outward embossments in said pipe and said cylindrical sleeve, a cylindrical coupler member having inwardly turned edge flanges, circular openings in said flanges, said pipe extended into one of said openings with the edge of said cylindrical sleeve abutting said edge flange and being welded thereto and a V-shaped gasket positioned about the end of said pipe within said coupler member and against one of said end flanges, said weld and complementary embossments forming a mechanical connection between said pipe and said coupler member and said gasket forming a fluid-tight seal therebetween.

4. Irrigation piping comprising a pipe having a cylindrical sleeve telescoped thereover and secured thereto adjacent one end of the same by a peripheral row of complementary outward embossments in said pipe and said cylindrical sleeve, a cylindrical coupler member having inwardly turned edge flanges forming end walls on the same, circular openings in said end walls, said pipe extended into one of said openings with the edge of said sleeve member abutting said end wall and being welded thereto and a V-shaped circular gasket positioned about the end of said pipe within said coupler member and against said end wall, said weld and complementary embossments forming a mechanical connection between said pipe and said coupler member and said gasket forming a fluid-tight seal therebetween, and a second V-shaped circular gasket in said coupler member positioned against said other end wall and surrounding said other opening to receive another pipe and make a fluid-tight seal therewith.

5. The combination of sections of irrigation piping, each section of pipe having a first cylindrical sleeve secured thereto at a point spaced from one end and a second cylindrical sleeve member secured thereto at a point spaced from its other end, a cylindrical coupler secured over said section of pipe to said second sleeve, said coupler having inturned edge flanges with circular openings therein through one of which said pipe extends, V-shaped circular gaskets positioned in each end of said coupler against said end flanges whereby when a second section of pipe is inserted therein and connected thereto a fluid-tight joint is secured by said gaskets, one of said gaskets encircling said pipe secured to said coupler and the other encircling the end of said second section of pipe inserted into the other end of said coupling.

6. Irrigation piping comprising a pipe having a cylindrical coupling at one end of the same, said coupling having a reduced cylindrical sleeve into which said pipe extends, said sleeve secured to said pipe by a peripheral row of embossments in said pipe and complemental pockets in said sleeve, said coupling having an inwardly turned end wall, a circular opening in said end wall and a V-shaped circular gasket positioned against said end wall and surrounding said opening to receive the end of a second pipe and make a fluid-tight seal therewith.

7. Irrigation piping comprising a pipe having a cylindrical coupling at one end of the same, said coupling having a reduced cylindrical sleeve into which said pipe extends, said sleeve secured to said pipe by a peripheral row of embossments in said pipe and complemental pockets in said sleeve, said coupling having an inwardly turned end wall, a circular opening in said end wall and a V-shaped circular gasket positioned against said end wall and surrounding said opening to receive the end of a second pipe and make a fluid-tight seal therewith, said coupling also having an inturned circular ridge spaced from the end wall to position one leg of the gasket therebetween.

GEORGE F. HAUF.

REFERENCES CITED

The following references are of record in the file of this patent:

UNITED STATES PATENTS

| Number | Name | Date |
|---|---|---|
| 277,427 | Recht | May 8, 1883 |
| 470,514 | Simpson | Mar. 8, 1892 |
| 487,434 | Steen | Dec. 6, 1892 |
| 1,240,098 | Sweeney | Sept. 11, 1917 |
| 2,049,801 | Gage | Aug. 4, 1936 |
| 2,083,966 | Sitzer | June 15, 1937 |
| 2,244,396 | Kellaher | June 3, 1941 |
| 2,251,651 | Ames et al. | Aug. 5, 1941 |